April 16, 1957 E. HELLMICH 2,788,820
KNIFE FOR CUTTING ONIONS
Filed June 4, 1953

INVENTOR,
ERNST HELLMICH
by
Jewett, Mead, Browne & Schuyler,
Attorneys

United States Patent Office 2,788,820
Patented Apr. 16, 1957

2,788,820
KNIFE FOR CUTTING ONIONS

Ernst Hellmich, Stuttgart-Botnang, Germany

Application June 4, 1953, Serial No. 359,485

2 Claims. (Cl. 146—147)

The invention relates to a saw toothed knife for cutting onions, each of the teeth of a main knife being provided with a short cross knife.

An object of the invention is to improve the cutting efficiency of the saw tooth knives to cut onions.

At the hitherto known knives of this kind the cutting edge of the cross knife is adjacent to the point of the proper tooth of the main knife, whereas in the knife according to the invention the point of each tooth of the main knife projects beyond the cutting edge of the proper knife at the root of the same.

The saw toothed knife according to the invention has the advantage that the points of the main knife when cutting enter the onion so as to avoid a slipping off of the knife at the spherical onion skin. When applying the cutting lever the novel knife for cutting onions will advantageously be designed so as to be interchangeably fastened to a lever-like holder as an insertion. This can simply be effected by the blade being inserted into a slot of the holder locking by itself.

Figure 1:
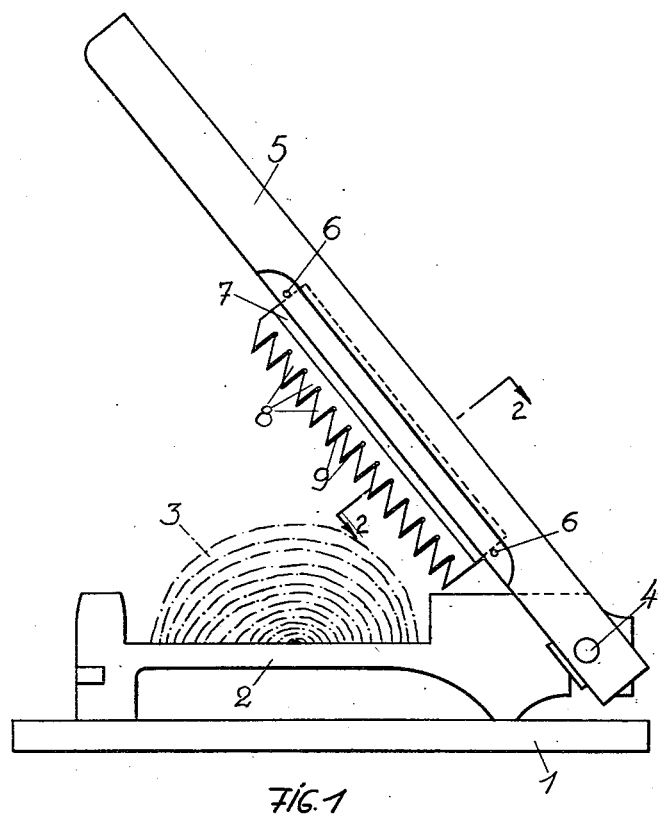
Figure 2:
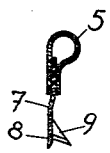

The accompanying drawing illustrates the invention, by way of example, in a design of the object. There show:

Fig. 1 a cutting device for onions with a cutting lever designed according to the invention with an inserted knife in one view, and Fig. 2 a section through the cutting lever and the inserted knife taken on the line 2—2 of Fig. 1.

Herein 1 means a preferably wooden kitchen cutting board of any shape on which a bridge-like base 2, made of plastics etc., by way of example, is fastened. This base is provided with a supporting plate for an onion 3. In this base a hand lever 5 is pivotally mounted by means of a horizontal pin 4. This hand lever is preferably made of stainless material and is, at least within a middle section, by way of example, U-shaped in the cross section so that a cutting blade made of sheet steel can be inserted into it between two stops 6. In this case it can appropriately be so designed within the range of this inserted blade that both its legs elastically grip the blade so that it locks by itself.

Blade 7 is formed with a series of longitudinally spaced cutting teeth 8 which define a saw-like cutting edge extending longitudinally of the blade, as best seen in Fig. 1. Each of the cutting teeth 8 is formed with a cross-tooth 9 which projects transversely at right-angles to blade 7. Cross-teeth 9 are connected to their associated cutting teeth 8 at the root portion of teeth 9, the root portion terminating short of the point of the associated cutting tooth 8 as best seen in Fig. 2 whereby the point of cutting tooth 8 engages the onion or other article to be cut before the root portion. As best seen in Fig. 2, cross-teeth 9 are likewise pointed and provided with an inclined cutting edge which extends inwardly of blade 7 from the point of tooth 9, the point of tooth 9 being transversely aligned with the point of tooth 8.

What is claimed is:

1. A knife for cutting onions or the like comprising a longitudinal blade, a series of pointed cutting teeth defining a saw-like cutting edge, each of said cutting teeth having a cross-tooth connected thereto, each of said cross-teeth being connected to its associated cutting tooth at the root portion of the cross-tooth and projecting from said root portion transversely of said blade, said root portions terminating short of the points of the associated cutting tooth whereby the points of said cutting teeth enter the article being cut before the root portions of said cross-teeth.

2. A knife for cutting onions or the like comprising a longitudinal blade, a longitudinal series of pointed cutting teeth defining a saw-like cutting edge of said blade, each of said cutting teeth having a cross-tooth connected thereto, each of said cross-teeth being connected to the associated cutting tooth at the root portion of the cross-tooth and projecting from said root portion at right angles to said blade, said root portion terminating short of the point of the associated cutting tooth, an inclined cutting edge extending transversely from said root portion to a point at the outer end of the cross-tooth, the point of each cross-tooth being transversely aligned with the point of the associated tooth.

References Cited in the file of this patent
UNITED STATES PATENTS

| | | |
|---|---|---|
| 845,627 | Gage | Feb. 26, 1907 |
| 1,156,781 | Jackson | Oct. 12, 1915 |
| 1,646,166 | Newton | Oct. 18, 1927 |
| 1,996,443 | St. Pierre | Apr. 2, 1935 |
| 2,250,651 | Pickens et al. | July 29, 1941 |
| 2,527,018 | Luzzi | Oct. 24, 1950 |